US011872867B2

(12) United States Patent
Larson et al.

(10) Patent No.: US 11,872,867 B2
(45) Date of Patent: Jan. 16, 2024

(54) TRACTOR TRAILER REFRIGERATION UNIT

(71) Applicant: eNow, Inc., Warwick, RI (US)

(72) Inventors: Gerald Larson, Warwick, RI (US); Jeffrey C. Flath, Warwick, RI (US); Robert W. Doane, Harwich, MA (US); Philip R. Pierce, Fernandina Beach, FL (US); Stephen Lasher, Warwick, RI (US); Ryan Kennedy Kemmet, Phoenix, AZ (US)

(73) Assignee: eNOW Systems LLC, Warwick, RI (US)

( * ) Notice: Subject to any disclaimer, the term of this patent is extended or adjusted under 35 U.S.C. 154(b) by 0 days.

(21) Appl. No.: 17/158,166

(22) Filed: Jan. 26, 2021

(65) Prior Publication Data

US 2021/0197645 A1 Jul. 1, 2021

Related U.S. Application Data

(63) Continuation-in-part of application No. 15/432,053, filed on Feb. 14, 2017, now Pat. No. 10,899,192, which is a continuation of application No. 14/635,270, filed on Mar. 2, 2015, now Pat. No. 9,586,458.

(60) Provisional application No. 61/946,036, filed on Feb. 28, 2014.

(51) Int. Cl.
*B60H 1/00* (2006.01)
*B60H 1/32* (2006.01)

(52) U.S. Cl.
CPC ..... *B60H 1/00428* (2013.01); *B60H 1/00014* (2013.01); *B60H 1/00364* (2013.01); *B60H 1/00764* (2013.01); *B60H 1/3232* (2013.01); *Y02T 10/88* (2013.01)

(58) Field of Classification Search
CPC ............ B60H 1/00428; B60H 1/00014; B60H 1/00364; B60H 1/00764; B60H 1/3232; Y02T 10/88
USPC ................ 322/28; 700/22; 62/115, 236, 243
See application file for complete search history.

(56) References Cited

U.S. PATENT DOCUMENTS

| | | |
|---|---|---|
| 3,218,821 A | 11/1965 | Spatt |
| 5,129,235 A | 7/1992 | Renken et al. |
| 5,680,907 A | 10/1997 | Weihe |
| 6,157,175 A | 12/2000 | Morinigo et al. |
| 6,223,546 B1 | 5/2001 | Chopko et al. |
| 6,227,002 B1 | 5/2001 | Bianco et al. |
| 6,321,550 B1 | 11/2001 | Chopko et al. |
| 6,700,214 B2 | 3/2004 | Ulinski et al. |
| 7,151,326 B2 | 12/2006 | Jordan et al. |

(Continued)

*Primary Examiner* — Pedro J Cuevas (74) *Attorney, Agent, or Firm* — DLA Piper LLP (US)

(57) ABSTRACT

A reefer truck power unit employs a plurality of power sources including roof mounted solar panels, momentum generation, shore power and high capacity storage batteries. The refrigeration system is configured for refrigerating a payload area of the vehicle utilizing power from the power sources, and employs a voltage converter for augmenting the power from the propulsion vehicle source for use with a native vehicle charging//starting system, and a transport load transformer for converting power from the power sources to 3 phase power for powering the refrigeration system. A bank of batteries stores power from the sources for subsequent dispersal to the refrigeration unit.

28 Claims, 8 Drawing Sheets

(56) References Cited

U.S. PATENT DOCUMENTS

| | | |
|---|---|---|
| 7,338,335 B1 | 3/2008 | Messano |
| 7,490,684 B2 | 2/2009 | Seymour et al. |
| 8,004,242 B1 | 8/2011 | Purkey et al. |
| 8,295,950 B1 | 10/2012 | Wordsworth et al. |
| 8,536,834 B2 | 9/2013 | Fink et al. |
| 8,556,321 B2 | 10/2013 | Johnson et al. |
| 8,692,398 B2 | 4/2014 | Neddermeyer et al. |
| 8,720,618 B1 | 5/2014 | Cohen |
| 8,789,381 B2 | 7/2014 | Awwad et al. |
| 8,800,307 B2 | 8/2014 | Thogersen et al. |
| 8,827,017 B2 | 9/2014 | Neddermeyer et al. |
| 8,911,703 B2 | 12/2014 | Mcalister |
| 8,935,933 B1 | 1/2015 | Koelsch |
| 8,955,624 B2 | 2/2015 | Cohen |
| 9,321,352 B2 | 4/2016 | Pierce et al. |
| 9,415,660 B2 | 8/2016 | Koelsch et al. |
| 9,586,458 B2 | 3/2017 | Larson et al. |
| 9,610,824 B2 | 4/2017 | Allen et al. |
| 9,707,844 B2 | 7/2017 | Arnold et al. |
| 9,937,819 B2 | 4/2018 | Healy |
| 9,948,136 B2 | 4/2018 | Doane et al. |
| 10,053,035 B1 | 8/2018 | Dixon et al. |
| 10,118,505 B2 | 11/2018 | Healy |
| 10,245,972 B2 | 4/2019 | Healy et al. |
| 10,300,871 B2 | 5/2019 | Dixon et al. |
| 10,384,560 B2 | 8/2019 | Healy |
| 10,389,121 B1 | 8/2019 | Sherry |
| 10,549,647 B2 | 2/2020 | Healy |
| 10,596,913 B2 | 3/2020 | Healy et al. |
| 10,618,481 B2 | 4/2020 | Dixon et al. |
| 10,654,369 B2 | 5/2020 | Healy et al. |
| 10,766,478 B2 | 9/2020 | Healy et al. |
| 10,899,192 B2 * | 1/2021 | Larson ............... B60H 1/00014 |
| 11,203,262 B2 * | 12/2021 | Schumacher ............ H02J 7/34 |
| 2002/0014329 A1 | 2/2002 | Carr et al. |
| 2008/0047766 A1 | 2/2008 | Seymour et al. |
| 2008/0170914 A1 | 7/2008 | Rutherford |
| 2009/0056354 A1 | 3/2009 | Davis et al. |
| 2010/0171364 A1 | 7/2010 | Awwad |
| 2011/0025126 A1 | 2/2011 | Brabec |
| 2011/0221573 A1 | 9/2011 | Huat |
| 2011/0316298 A1 | 12/2011 | Rampersad |
| 2012/0000212 A1 * | 1/2012 | Sanders ................ F25D 29/003 236/51 |
| 2012/0081067 A1 | 4/2012 | Burrell |
| 2014/0025245 A1 | 1/2014 | Fanourakis et al. |
| 2014/0116077 A1 | 5/2014 | Pierce et al. |
| 2014/0271261 A1 * | 9/2014 | Boelryk ................ B60C 23/137 417/233 |
| 2015/0246593 A1 | 9/2015 | Larson et al. |
| 2016/0318421 A1 | 11/2016 | Healy |
| 2017/0217280 A1 | 8/2017 | Larson et al. |
| 2018/0233944 A1 | 8/2018 | Doane et al. |
| 2018/0354437 A1 | 12/2018 | Dixon et al. |
| 2019/0202429 A1 * | 7/2019 | Richter ................ B60W 10/06 |
| 2019/0270418 A1 | 9/2019 | Dixon et al. |
| 2019/0277647 A1 | 9/2019 | Adetola et al. |
| 2019/0288350 A1 | 9/2019 | Saroka et al. |
| 2020/0238932 A1 | 7/2020 | Dixon et al. |
| 2021/0070138 A1 * | 3/2021 | Schumacher ............ H02J 7/35 |
| 2021/0213797 A1 * | 7/2021 | Saroka ................ B60L 1/003 |
| 2021/0213805 A1 * | 7/2021 | Saroka ................ H02J 7/345 |
| 2021/0213806 A1 * | 7/2021 | Saroka ................ H02J 7/0068 |
| 2021/0260954 A1 * | 8/2021 | Saroka ................ B60H 1/00364 |
| 2021/0260964 A1 * | 8/2021 | Saroka ................ H02J 7/1438 |
| 2022/0105807 A1 * | 4/2022 | Schumacher ............ B60L 1/02 |

\* cited by examiner

*FIG. 8B*

TRACTOR TRAILER REFRIGERATION UNIT

RELATED APPLICATIONS

This patent application is a continuation-in-part (CIP) under 35 U.S.C. § 120 of U.S. patent application Ser. No. 15/432,053, filed Feb. 14, 2017, entitled TRACTOR TRAILER REFRIGERATION UNIT," which is a continuation under 35 U.S.C. § 120 of U.S. patent application Ser. No. 14/635,270 filed Mar. 2, 2015, entitled "TRACTOR TRAILER REFRIGERATION UNIT," which claims the benefit under 35 U.S.C. § 119(e) of U.S. Provisional Patent Application No. 61/946,036 filed Feb. 28, 2014, entitled "TRACTOR TRAILER REFRIGERATION UNIT," incorporated herein by reference in entirety.

BACKGROUND

Refrigeration trucks provide an effective means of long distance transport for perishable goods. Power requirements for maintaining the perishable load encompass a compressor for circulating refrigerant and a fan for circulation of temperature controlled air. A refrigeration unit may be attached to the front of a class-8 (tractor-trailer) for maintaining controlled temperatures during transport. Often, the refrigeration unit receives power from the tractor while in motion. Typically, the refrigeration unit is powered by a small diesel engine that is integral with the refrigeration system on the trailer. The small engine operates when the truck is in-motion, and from an external utility, or "shore power" source when stationary. Longer transport ranges may require extended periods where the trailer is stationary and without shore power, and modern, evolving "no-idle" laws may limit the effectiveness of idling a tractor motor or invoking a separate generator for of using the small diesel engines for maintaining refrigeration.

SUMMARY

A reefer truck power unit employs a plurality of power sources including a high capacity storage battery and a passive vehicle source including a bank of solar panels disposed on the vehicle. A momentum based source may also complement the solar panels. The refrigeration system is configured for refrigerating a payload area of the vehicle utilizing power from the power sources, and employs a voltage converter for augmenting the power from the passive sources for use with a native vehicle charging//starting system, and a transport load transformer for converting power from the power sources to 3 phase power for powering the refrigeration system. A bank of batteries stores power from the sources for subsequent dispersal to the refrigeration unit.

So-called "reefer" trucks include class 7 and class 8 heavy duty trucks configured with a refrigerated cargo area for transporting perishable and frozen goods. More colloquially referred to as "18 wheelers" and "box" trucks, these vehicles employ a dedicated refrigeration mechanism for cooling a cargo or payload area. Conventional refrigerated loads employ a trailer mounted generator that operates separately from the diesel engine which provides primary vehicle propulsion. In configuration herein, a power source for refrigerated class 8 (tractor trailer) trucks and non-articulated box trucks employs a mechanical linkage from the propulsion vehicle engine, such as a tractor or cab diesel engine, and supplements propulsion vehicle power with a passive vehicle source such as solar panels and a storage element (i.e. battery) for providing continuous refrigeration for a perishable cargo. An enhanced alternator and pulley arrangement, or a PTO (power take-off) linkage represent two configurations for drawing reefer power directly from the propulsion vehicle, rather that requiring a dedicated diesel engine generator apparatus.

The disclosed power control system depicts a method and apparatus for standalone mobile refrigeration that employs a plurality of power options for refrigeration which need not rely on a dedicated combustion-based source provides a tractor trailer or box truck with the capacity to transport perishable loads by leveraging and storing power gathered from passive sources such as solar and incidental sources such as the electrical generation capacity of the native vehicle charging and starting system.

Configurations herein are based, in part, on the observation that conventional refrigeration ("reefer") units for class-8 tractor trailer trucks and non-articulated box trucks often rely on a separate, dedicated generator and diesel engine for providing power to the refrigeration unit (compressor and fan). Unfortunately, conventional approaches suffer from the shortcoming that the addition of a dedicated engine solely for accommodating the refrigeration load increases pollution, cost and maintenance by introducing a separate fossil-fuel based combustion source into the transportation overhead. The modern trend toward "green" business practices identifies diesel engines of freight trucks as a major contributor of pollution. In observing the necessary role played by diesel based transport in the national economy, the Federal Government has mandated provisions to prohibit excessive idling of freight trucks to at least mitigate pollution.

Configurations herein substantially overcome the above-described shortcomings by providing a standalone refrigeration system that does not rely on a standalone diesel generator for powering the refrigeration load. A combination of solar panels, high capacity storage batteries, and an enhanced alternator to retrofit the native vehicle alternator powers a refrigeration system without an additional combustion source.

A propulsion vehicle source such as a high capacity alternator derives power from the routine rotation of the diesel engine. A passive vehicle source such as solar panels combines with the propulsion vehicle power for supporting a vehicle based load such as the reefer, and a storage element such as high capacity bank of batteries stores excess power to provide electrical inertia and "smooth out" variances in the alternator and solar sources. Reefer units are often disposed in a dedicated enclosure on the front of the trailer or box truck cargo area. The enclosure houses the compressor, electric motor, condenser and fan of the reefer system. Conventional arrangements typically place the diesel generator in this enclosure, however configurations herein utilize this area below the compressor for a bank of storage batteries, since the diesel generator is not required.

In a particular configuration disclosed below, the alternator is a high capacity 24 v alternator, and a native load transformer, such as a 12 v DC-DC converter transforms power needed to support the 12 v needs of the native vehicle charging and starting system (i.e. vehicle lights, fans, mobile electronics, etc). A transport load transformer such as an inverter couples to the 24 v storage element for providing 230 v 3-phase power for operating the refrigeration compressor and fans. An interface to an alternate power source, such as shore power, is invokable when the vehicle is parked. The storage element may operate on other than 24 v by configuring the batteries, such as disclosed in copending U.S. patent application Ser. No. 13/752,765, filed Jan. 29, 2013, entitled "METHOD AND APPARATUS FOR VEHICULAR ENERGY MANAGEMENT," incorporated herein by reference. Similarly, the reefer unit may operate on electrical power characteristics other than 230-240vAC 3-phase, and the inverter adjusted to match.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A trailer power supply system for mobile Class-8 tractor-trailer refrigeration provides multiple and stand-alone power options for maintaining refrigeration trailers in an existing footprint commonly used by conventional diesel powered approaches.

Figure 1:
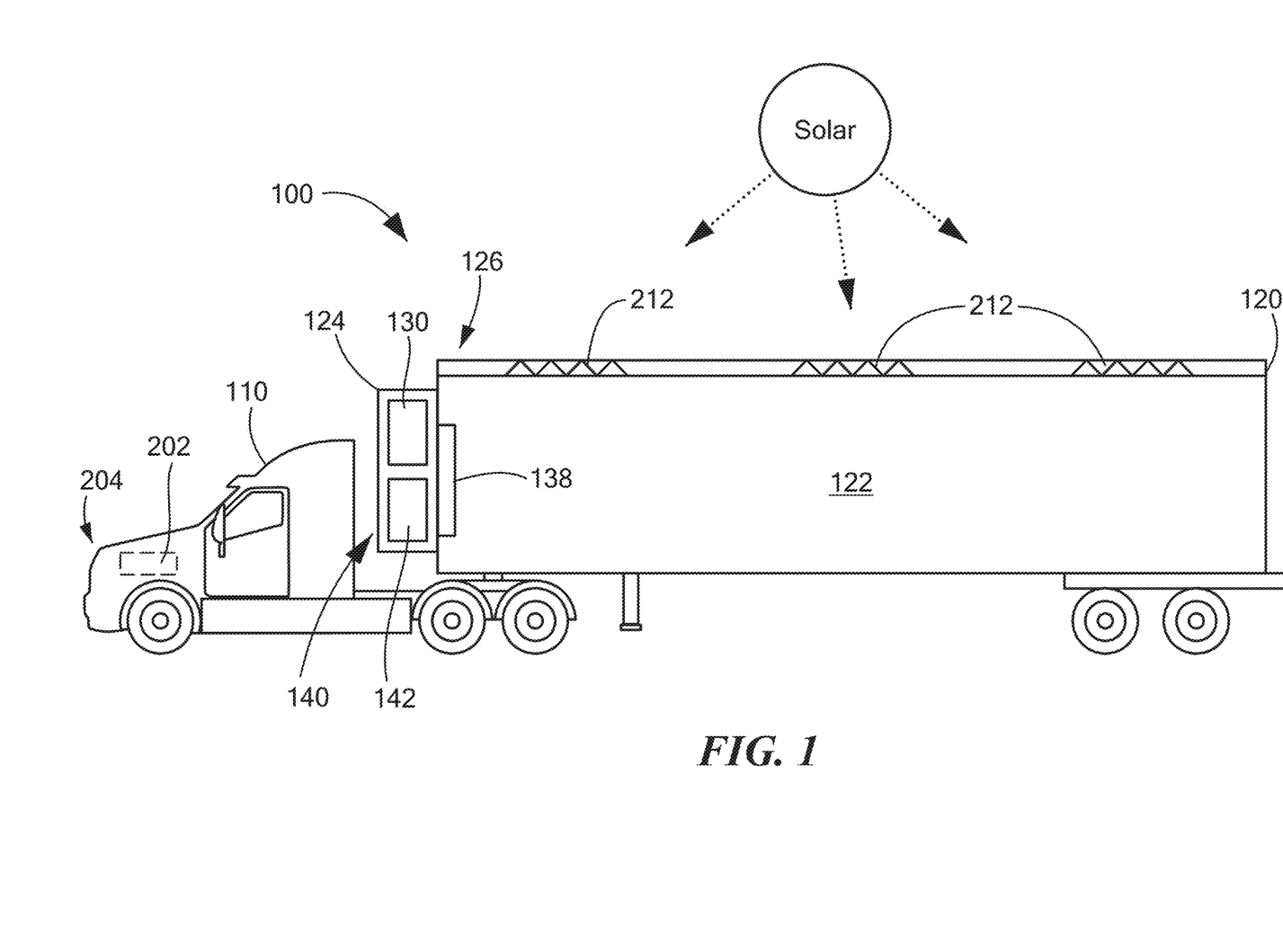
FIG. 1 is a trailer power environment suitable for use with configurations disclosed herein.

FIG. 1 is a trailer power environment suitable 100 for use with configurations disclosed herein. Referring to FIG. 1, a tractor trailer typically includes a propulsion vehicle 110 articulated to a trailer 120. The trailer 120 is substantially a rectangular box shape defining a refrigerated cargo area 122. A rack 124 or similar enclosure on a front end 126 of the trailer supports and houses refrigeration system 130 for cooling the cargo area 122. A non-articulated vehicle, commonly called a "box" truck, may also define the propulsion vehicle 110 and cargo area 122, and usually employs a slightly smaller cargo area. The refrigeration system 130 may be operable for so called medium temperature storage, for transport of perishable foods around 34 degrees F., or low temperature which encompasses frozen foods.

The refrigeration system 130 includes a compressor, electric motor, and condenser, and an evaporator 138 in the cargo area provides heat transfer for cooling the cargo area 122. Battery storage 140 occupies an area on the rack below the refrigeration system, in a region utilized by a diesel generator in conventional approaches.

Figure 2:
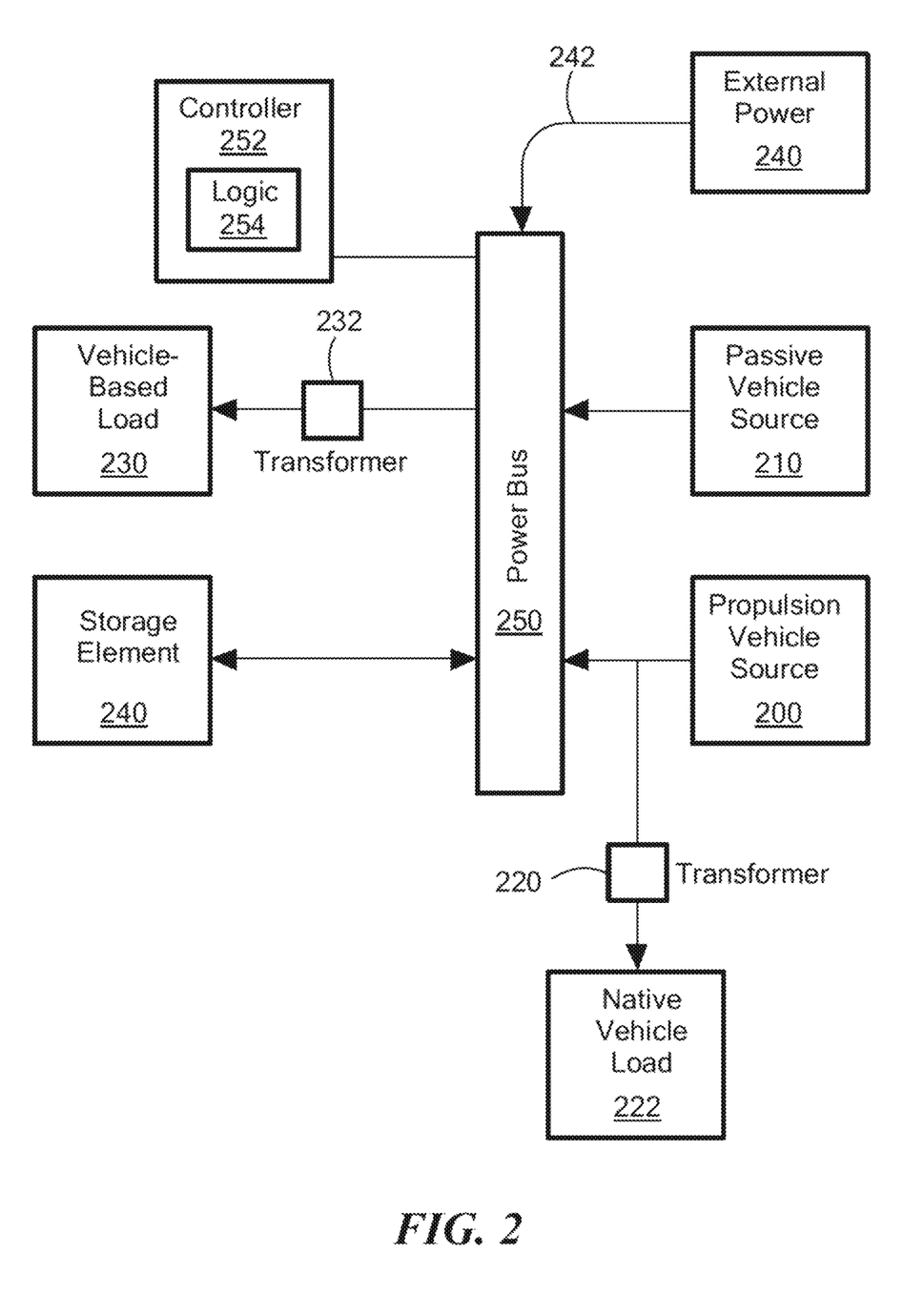
FIG. 2 is a block diagram of the reefer power system disclosed herein.

FIG. 2 is a block diagram of the reefer power system disclosed herein. Referring to FIGS. 1 and 2, a propulsion vehicle source 200 generates power from an enhanced alternator 202 on the diesel engine 204 that provides primary propulsion for the vehicle 110. Alternate configurations may employ a PTO drive or momentum generation source, discussed below.

A native load transformer 220 adjusts electrical characteristic such as voltage to suit the load, typically a 12 v environment. A passive vehicle source 210 such as solar panels 212 provides additional power input. Both the propulsion vehicle source 200 and the passive vehicle source 210 aggregate in a power bus 250, for powering a vehicle based load 230 such as the refrigeration system (reefer) 130. A storage element 240 such as a battery or bank of batteries 142 stores excess power not immediately consumed by the vehicle based load 230. A transport load transformer 232, such as an inverter, adjusts electrical characteristics to the reefer 130, which typically operates on 230 v 3-phase power. In the example configuration, the power bus 250 carries 24 v power from the enhanced alternator 202 and the solar panels 212, however other voltage characteristics may be employed. An alternate power source 241 such as shore power may be provided via an alternate power interface 242 when the vehicle is stationary.

Figure 3:
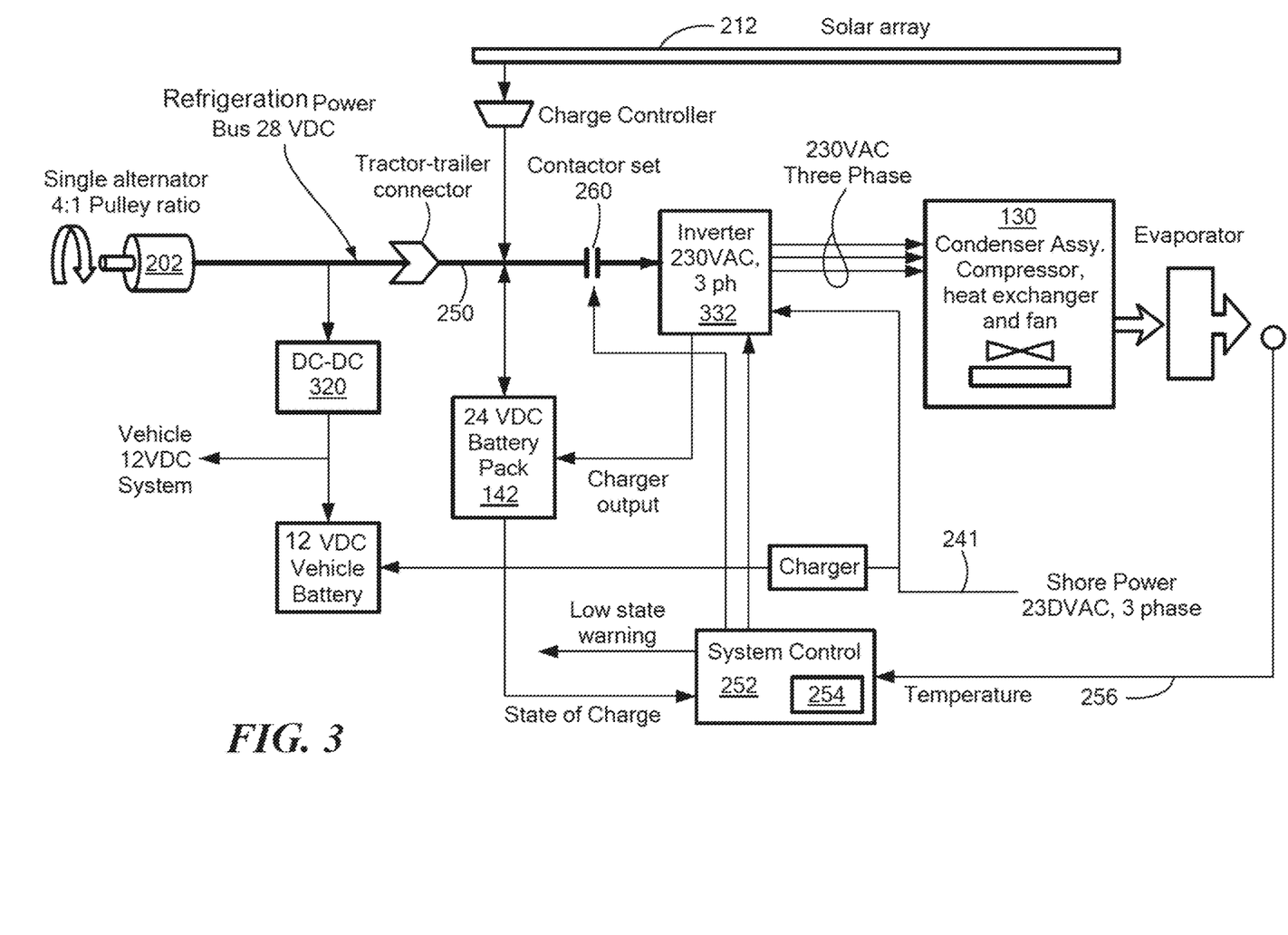
FIG. 3 depicts an enhanced alternator configuration of the power system in FIG. 1.

FIG. 3 depicts an enhanced alternator configuration of the power system in FIG. 1. Referring to FIGS. 1-3, in the self-contained vehicle power system operating in the environment 100, an electrical controller 252 includes control logic 254 for powering the transport vehicle based load 230. The enhanced alternator 202 provides a propulsion vehicle source 200 driven by a native propulsion source, typically the diesel engine 204, of the vehicle. The enhanced alternator 202 replaces the standard 12 v OEM (original equipment manufacturer) alternator with a higher capacity 24 v 320 amp or similar alternator.

The passive vehicle source 210, such as solar panels 212, are disposed on the roof of the trailer vehicle 120 and are adapted for providing power independently of vehicle motion or engine state. The solar panels 212 provide power at 24 v to correspond to the enhanced alternator 202 and batteries 142. Particular configurations dispose the storage element 240 on a forward wall of the cargo area 122 of the vehicle adjacent the refrigeration compressor in a volume typically invoked for storing a generator power source for the refrigeration compressor, such as the rack area 124.

Refrigeration equipment 130 defines the vehicle based load 230 responsive to power from the propulsion vehicle source 200 or the passive vehicle source 210. An interface transformer 220 to a native vehicle load 222, such as a DC-DC converter powers the native vehicle load 222 concurrently with the vehicle based load 230 from the enhanced alternator 202. The bank of batteries 142 define the storage element 240 configured for accumulating excess power for subsequent dispersal to the vehicle based load 230. In this manner, the refrigeration system 130 employs a plurality of power sources, including a propulsion vehicle source driven mechanically by a native propulsion source of the vehicle using an enhanced alternator 202 configured for generation in excess of needs of a charging/starting system of the vehicle. The enhanced alternator has a pulley ratio increasing idle speed generation. Power sources also include a passive vehicle source including a bank of solar panels 212 disposed on the vehicle, such that the refrigeration system is configured for refrigerating a payload area 122 of the vehicle utilizing power from the power sources.

The propulsion vehicle source 130, in a particular environment, includes the enhanced alternator 202 for power generation in excess of that produced by a native vehicle charging system, and is expected to be in the range of 24 v at 320 amps (amperes). OEM alternators for vehicles in this class are typically on the order of 12 v at 160 amps. In order to provide sufficient power at idle engine speeds, the enhanced alternator 202 has a pulley ratio of at least 4:1 for generating converted voltage sufficient for operating a 3 phase, 240 v refrigeration load. The engine pulley/serpentine/belt drive arrangement may also be modified such that the enhanced alternator 202 employs a rotary drive interface configured for operation with belt tensioners on the native vehicle, such that the rotary drive interface is sufficient for operating the refrigeration load at an idle engine speed of the native vehicle. Modification of the pulley size to incorporate a smaller pulley allows higher RPMs, and thus higher wattage (power) to be produced. Pulley size is modified within a range that the additional length on the belt is absorbed by the native vehicle tensioners, and does not require further modification to the belt drive system. In other cases, other pulleys may need to be enlarged, and/or belt tensioners modified to accommodate the smaller pulley.

In a particular arrangement, the enhanced alternator 202 produces a nominal 24 v power signal (typically 28 v peak for charging a 24 v battery) while the native propulsion vehicle loads operate nominally on 12 v, as is typical with vehicular electric and charging/starting systems. The storage element 240 is configured for providing a 24 v power signal adapted for aggregation with the enhanced alternator 202, and is adapted to receive substantially around 28 v generated by the alternator 202. The transport load transformer 232 takes the form of an inverter configured for producing substantially 230 v AC power from the aggregated 24 v power signal adapted for powering the vehicle based load 230, in which the vehicle based load includes a refrigeration compressor and fan.

The passive vehicle source 210 includes a bank of solar panels 212 disposed on a roof of a cargo payload area 122 of the vehicle, such that the storage element 240 is configured for receiving and storing excess power from the solar panels. In a typical operating scenario, running a reefer 130 unit for medium temperature (perishables), the configuration above draws 13.0 Kw with the compressor and fan operating. Note that the compressor need only operate when cooling is called for, and therefore fluctuates with ambient temperature 256. Vehicle demands may place another 1.0 Kw demand. Refrigeration demands, adjusted for compressor cycling, average about 9.1 Kw. Even on a cloudy day, the solar panels provide about 1.5 Kw, thus requiring 7.6 Kw (9.1 Kw-1.5 Kw) to operate the reefer 124. With the adjusted pulley and enhanced alternator 202, 7.0 Kw is produced at a 700 rpm idle, resulting in an 8% shortfall that is accommodated by the batteries 142. Idling the engine at 1200 rpm, however, produces 8.4 Kw, and running operation at 1400 rpm provides 8.6 Kw, providing a margin of 70%.

In a particular example configuration as disclosed herein, the above calculations for energy balance include appropriate operation at engine idle, high idle RPM (which may be set with the vehicle J1939 Data Bus), and at highway speeds. The disclosed example configuration is operable for Dedicated Regional Haul Medium Temperature Refrigeration applications where vehicles are loaded, then travel same day directly to delivery locations. With same day operation, drivers do not need to stop for mandatory ten hour rest periods. Medium Temperature Refrigeration is for dairy, fruit, and vegetables where the refrigeration temperature is 35° F. Alternate configuration will have sufficient power for low temperature refrigeration applications. Typical frozen products are maintained at −10° F. temperatures.

As indicated above, the tractor electrical power generation is modified: The 24 VDC alternator is replaced with a high output 28 VDC alternator and the alternator is equipped with a smaller pulley to enable better power at low engine speeds; the desired pulley ratio is in the 4:1 range. Conventional trucks are sold with lower power output 14 VDC alternators, (typically 160 Amp units). The specified 28 VDC unit is rated for 10 KW power (360 Amps at 28 VDC). The 4:1 pulley ratio would allow use with existing engine accessory belt and tensioners should to provide sufficient "belt wrap" on the alternator pulley without modification belt length or tensioners.

The tractor-trailer power system is low voltage (28 VDC) which is significant for end user employers since they prefer drivers or mechanics to not have access to high voltages (UL Class II voltage limit is 60 VDC for low voltage systems). However, tractor-trailer connector current is high, so multi-strand high flexibility, high current cables may be employed.

The addition of the enhanced alternator 202 is accommodated by the vehicle by a converter for transforming the voltage from the enhanced alternator to voltage suitable for the native propulsion vehicle electrical demand. Since the enhanced alternator 202 operates on different voltage characteristics than the native vehicle charging system, the vehicle load transformer 220 is a converter 320 for augmenting the power from the enhanced alternator 202 for powering the vehicle based load 230. The native load transformer 220, in the example configuration, is a 24 v-12 v DC-DC converter, to allow normal operation of the OEM vehicle electrical and starting/charging system.

The controller 252 includes control logic 254 for directing power from the propulsion vehicle source 200 and the passive vehicle source 210 to the refrigeration system 130 based on a computed demand of cooling capacity. The control logic engages a contactor set 260 or other switching apparatus for directing power to the inverter 232

Also included is an alternate power interface 242 adapted to receive external power for supplementing the propulsion vehicle source and the passive vehicle source. Truck stops and other rest and stopping facilities allow an external hook up to maintain reefer power and to "top off" the batteries 142.

Figure 4:
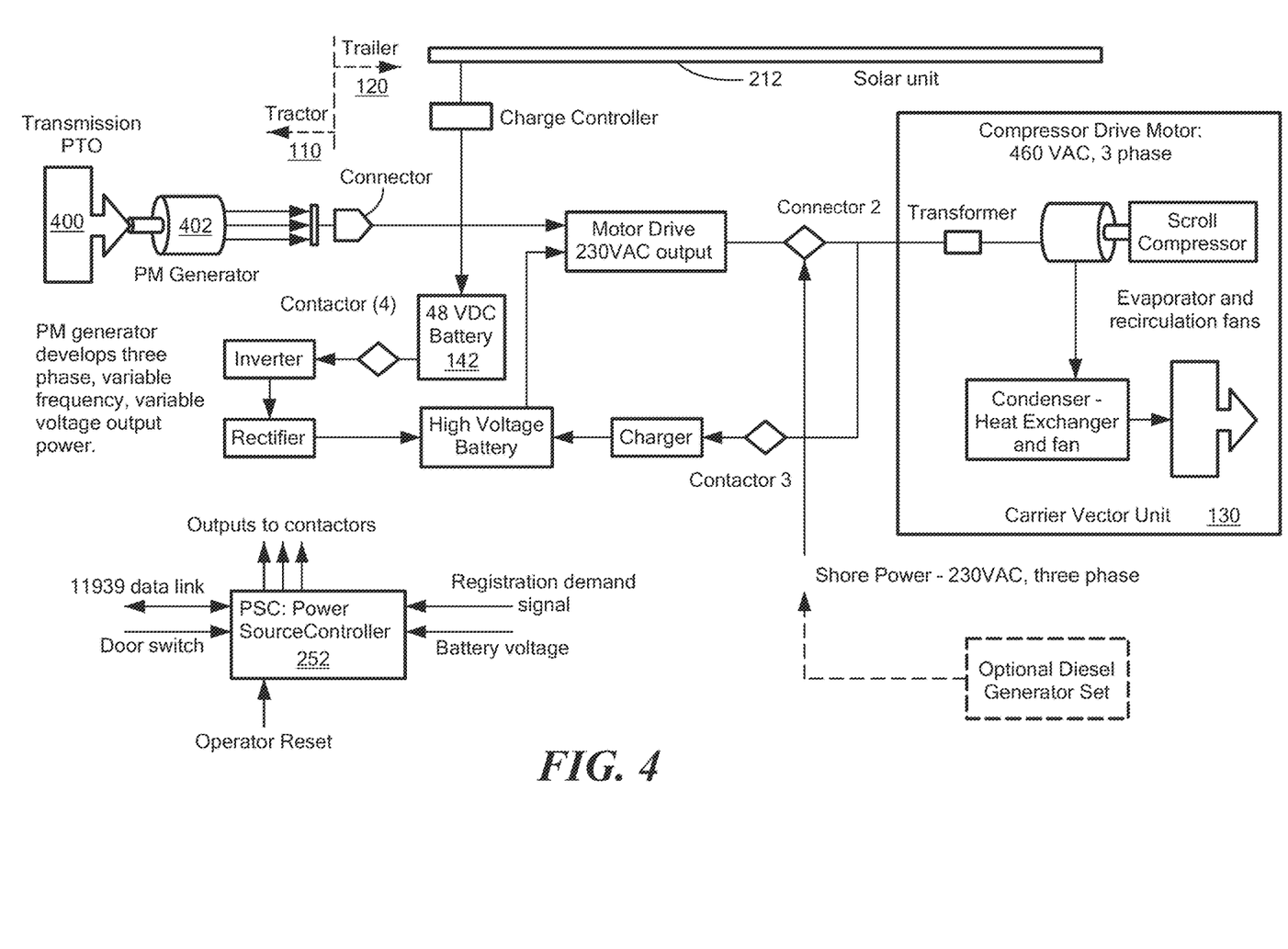
FIG. 4 depicts a PTO configuration of the power system of FIG. 1.

FIG. 4 depicts a PTO configuration of the power system of FIG. 3. The alternate configuration includes a PTO linkage, rather than an alternator connection, such that the propulsion vehicle source 130 further comprises a PTO (power take-off) interface 400 responsive to a tractor for receiving rotational power, and a PM (permanent magnet) generator 402 for producing input power from the rotational power.

Deployment as above involves installing the propulsion vehicle source 130, such as enhanced alternator 202, for enhancing a voltage generation capability of a native vehicle charging and starting system. This involves modifying a pulley ratio for increasing power output of the voltage generation during propulsion vehicle idle. A DC-DC converter provides 12 v allowing for converting at least a portion of power from the enhanced voltage generation for powering native propulsion vehicle loads. The batteries 142 store power harvested from a passive power source 210 such as solar panels 212 disposed on the vehicle, as well as excess power from the enhanced alternator 202. Such an approach may be retrofitted or designed into existing space requirements such those of the Carrier® Vector unit or similar refrigeration sources. Typical refrigeration sources include power demands of a scroll compressor and ventilation fan. A power bus 250 and controller 252 combine power from the generated voltage and the stored, harvested power, and the inverter 332 augments the combined power for driving a refrigeration unit on the vehicle, typically via 230 v 3-phase power.

Conventional approaches suffer from various shortcomings not present in the novel power gathering and management approach outlined herein. For example, U.S. Pat. No. 6,223,546 shows a trailer mounted compressor unit designed to occupy the "swing area" between the tractor and the trailer. A generating unit adjacent to the vehicle prime mover provides a direct coupling between the compressor electric motor and generator to mitigate exposure to the mechanical linkage driving the compressor. This approach avoids exposure of a mechanical PTO linkage from the truck motor to drive the refrigeration compressor, which typically includes seals and bearings around a rotating shaft that can be prone to wear from environmental exposure. The disclosed approach, by drawing electrical power from the enhanced alternator and solar powered battery, avoids a vulnerable PTO linkage and the addition of a dedicated generator for refrigeration electrical power. Other approaches include operating the compressor in a reduced output mode to correspond to the fluctuations of the speed of the directly coupled shaft, which varies with vehicle speed, as disclosed in U.S. Pat. No. 8,789,381, initially assigned to Carrier Corporation of Syracuse, NY. In contrast, Configurations herein employ a pulley of a prescribed size for maintaining idle time speed of the enhanced alternator. Start-up compressor motor voltages, which may often need to overcome head pressure in the compressor, are accommodated by the high capacity storage element (Battery) 142, which gathers solar generation from trailer mounter panels and provides an electrical surge for startup, in contrast to U.S. Pat. No. 6,321,550, which provides a means for unloading compressor pressure at startup.

Other conventional approaches avoid a PTO linkage through the use of a mechanical power transfer system, which effects an additional mechanical linkage for a generator disposed outside of the engine compartment in addition to the vehicle primary generation system (i.e. alternator). Such an approach is depicted in U.S. Pat. Nos. 8,995,624 and 8,720,618, to Aura Systems Inc. Configurations herein, in contrast, do not require a second generator outside of the engine compartment and separate from a PTO linkage, U.S. Pat. No. 6,157,175 monitors the speed of an engine driven generator for modifying a power output signal based on engine speed. The approaches herein employ a pulley size and tensioner arrangement for maintaining generator speeds within acceptable levels. U.S. Pat. No. 6,700,214 employs signaling over a power bus for driving voltage levels to desirable levels.

U.S. Pat. Nos. 8,827,017, 8,692,398 and 8,536,834, to Thermo King Corporation, suggest a mobile environmentally controlled unit monitored for cycling an internal combustion engine powering a compressor for cooling the environmentally controlled unit. In contrast to conventional approaches, some of which are outlined above, the disclosed configurations teach a propulsion vehicle source including an enhanced alternator and a passive vehicle source connected to a storage element for buffering and maintaining consistency in a power level sufficient for powering a vehicle based load such as a refrigerated trailer through cyclic compressor activation.

In further detail, the PTO adaptation shown in FIG. 4 illustrates a hybrid vehicle traction drive system to the trailer power electric refrigeration system. Mechanical power is applied to a high efficiency permanent magnet generator via a PTO drive shaft coupled to the generator. The resulting variable voltage, variable frequency electrical power is transferred to the trailer via a high voltage (shore power) connector. The power from the generator must be converted to useful constant voltage (230 or 460 VAC), constant frequency (60 Hz) motor drive power. This is accomplished with a traction drive (PD300) that has been configured for the constant voltage, constant frequency need. Note: The traction drive package is located on the trailer to avoid space constraints on the tractor.

The generator arrangement therefore includes a PTO (power take-off) interface responsive to a tractor for receiving rotational power, and a PM (permanent magnet) generator for producing input power from the rotational power. The PM generator is configured for providing a variable voltage and variable frequency AC signal based on a rotation speed of the PTO interface, which integrates will with the manual transmission output of the tractor. The drive electronics circuit is responsive to the PM generator for generating an electrical signal to which the refrigeration compressor is responsive, in effect "smoothing" or "filtering" the raw power output from the PTO to provide a suitable AC signal. The PM generator driven by the PTO should also be distinguished from an external diesel generator which may be invoked as an alternate source, if needed (discussed further below).

In the example configuration, the trailer power refrigeration system operates with 460 VAC, three phase, 60 Hz power. However, a 2× step-up transformer is available to enable operation with 230 VAC three phase power. The system as shown employs the step-up transformer to enable operation with the available traction drive.

The electronic control unit is used to determine power sourcing to the refrigeration unit. Shore (utility) power has first priority, PTO generated power has second priority, and power source conflicts are avoided by disabling PTO generated power via an electrical contactor whenever the presence of shore power is sensed. The control unit includes a switch responsive to the drive electronics circuit for identifying an available source of the input power, and connecting the drive electronics circuit to the identified available source. The alternate power interface is responsive to a shore power connection for receiving the input power from an external power connection. Therefore, the alternate power interface is sensed and power drawn appropriately from solar, external, or PTO based sources.

Figure 5:
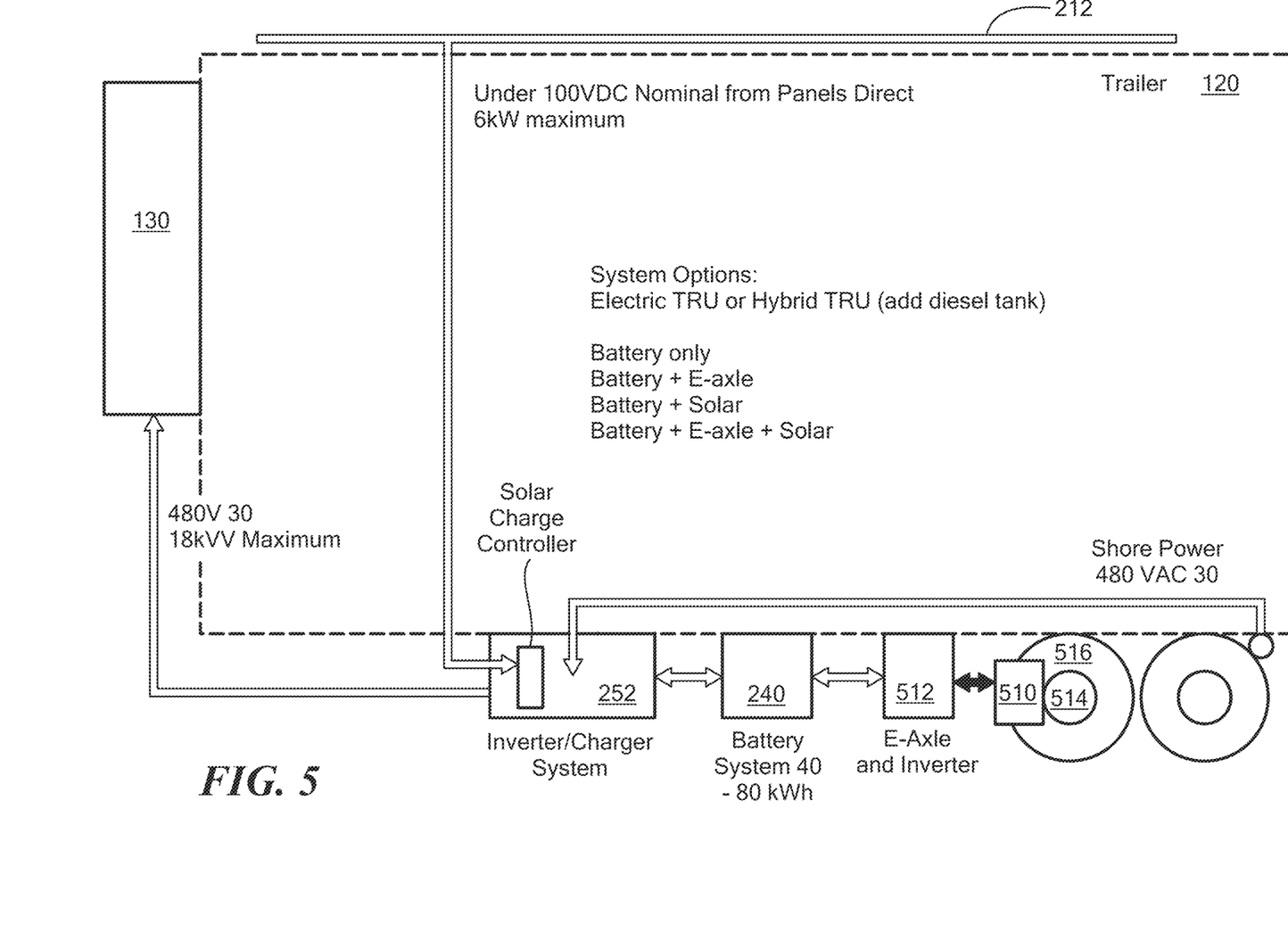
FIG. 5 is a schematic diagram of an alternate arrangement having a momentum generative axle.

FIG. 5 is a schematic diagram of an alternate arrangement having a momentum generative axle. A common feature to the configurations herein is an energy efficient implementation of a reefer truck configuration by leveraging passive, or near passive, sources that arise from normal reefer truck operation. The above implementations feature roof mounted solar panels for harvesting ambient solar energy for powering a reefer compressor. Power may also be harvested from the momentum based generator driven by a trailer axle, and from a shore power source operable when the trailer vehicle is stationary, such as at a truckstop, loading facility or similar bay configured with a shore power receptacle.

Referring to FIGS. 1, 2 and 5, the mobile refrigerated transport vehicle, typically the trailer 120, includes a passive vehicle source 210 configured for providing electric power to an electric load on the transport vehicle, and a storage element 240 for storing electrical power, often a battery of a suitable chemistry. One or more solar panels 212 define one passive vehicle source, as complemented by other sources described further below. The refrigeration unit 130 is powered by the electric power from the battery, as charged by the solar panels 212. A converter or transformer 232 transforms electrical characteristics of the stored electric power from the storage element 240 to correspond to the refrigeration unit 130. The controller 252 determines distribution of the electric power from the passive vehicle source to the storage element 240 and the refrigeration unit 130.

One or more passive vehicle sources may be attached or configured to the trailer 120, such that each passive vehicle source supports production of electric power from sources incidental to transport of the refrigerated transport vehicle. One of the passive sources is defined by the solar panel array 212. As with previous configurations, the solar panel array 212 is disposed on a roof of the transport vehicle 120, such that the roof encloses a refrigerated compartment cooled by the refrigeration unit. Typically the transport vehicle 120 is an articulated trailer, however straight frame "box" trucks may also employ all the disclosed features; a distinction is only the length of the refrigerated cargo area 122, as well as a corresponding relaxation of the cooling power needed. Class 8 tractor trailer examples are used to illustrate the maximum performance of the systems herein.

Figure 6:
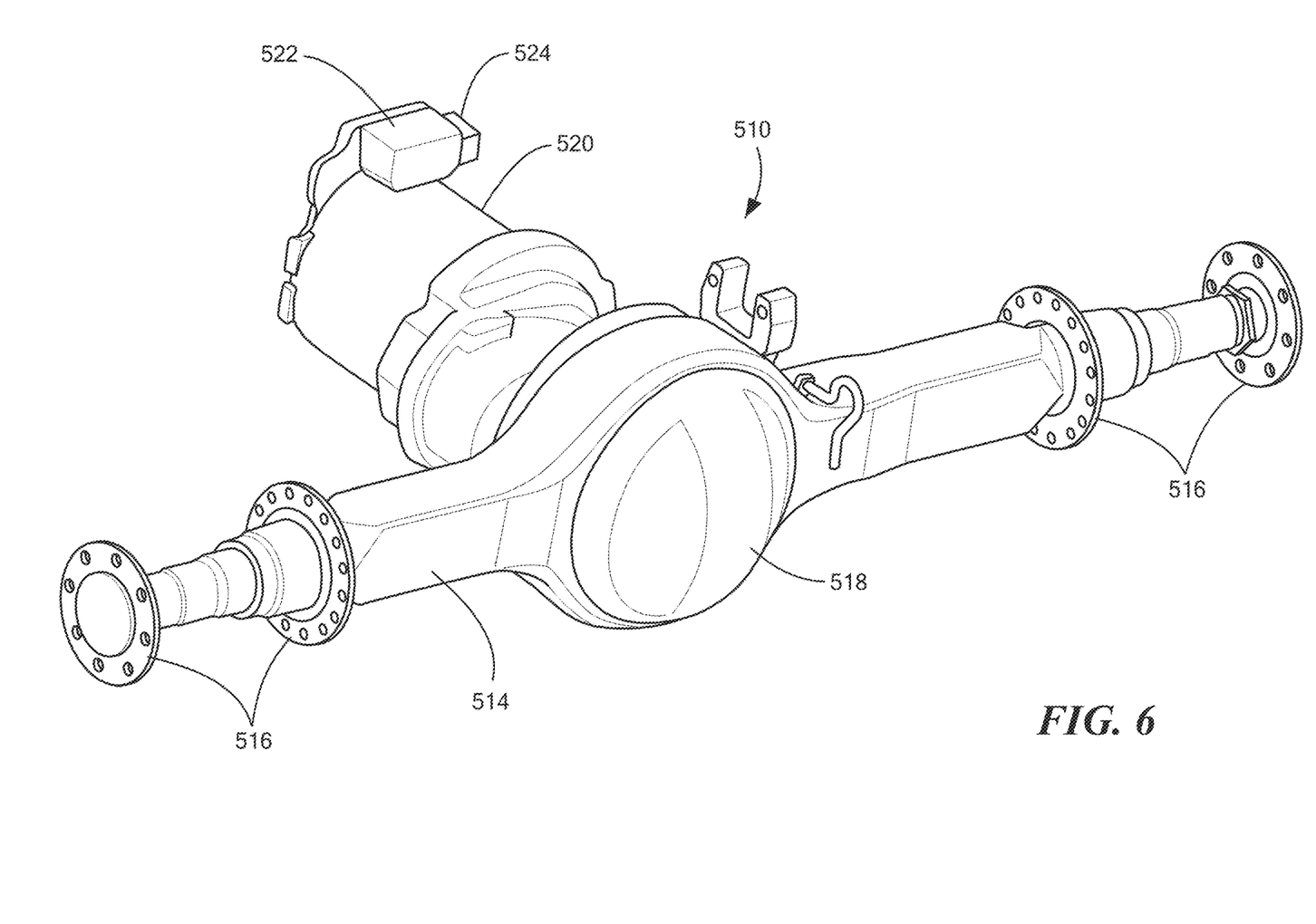
FIG. 6 is a perspective view of the generative axle in FIG. 5.

FIG. 6 is a perspective view of the generative axle in FIG. 5. A large transport vehicle traveling at high speed exhibits a tremendous amount of inertial energy. Upon braking, this kinetic energy is converted to heat by the vehicle brakes. However, in contrast, a passive source may be defined by a generative axle 510 assembly configured to passively generate electric power from motive transport of the transport vehicle 120. The generative axle 510 includes a live axle 514 disposed between opposed wheels 516 and tires supporting the transport vehicle, and a generator 520 responsive to rotational input for generating electrical energy. A differential 518 centered between the opposed wheels couples the live axle 514 to the generator 520 for transmitting the rotational input based on movement of the wheels 516. The configuration of FIG. 5 therefore includes a solar panel array 212 and a generative axle 510 as vehicle created sources of power. Similar to the enhanced alternator configuration above, the controller 252 is configured for prioritizing transmission of the electric power for supporting minimum requirements of the refrigeration unit 130, and for transmitting excess electric power for charging the storage element 240 upon satisfaction of the requirements of the refrigeration unit.

Although the generative axle 510 harvests rotational energy from the wheels, and therefore imposes a slight drag, selective engagement of the generative axle engages the generator 520 only when coasting and braking, and avoids burdening the motive vehicle (i.e. tractor) with additional drag when accelerating or traveling up grade. Although the generative axle and the trailer wheels share an indirect kinetic source with the diesel engine in the tractor, this burden is negligible to non-existent. The effect of gravity also effects inertial force of the trailer, and switching/control of the generator 520 based on inertia can filter any imposition on the diesel sourced power by generator activation only during braking or coasting, when the momentum would likely be lost as heat energy due to braking.

Accordingly, a momentum generation controller 522 regulates the regenerative axle 510. The momentum generation controller 522, disposed on the generator 520, is responsive to the controller 252 and includes an inertial sensor 524. The inertial sensor 524 includes one or more accelerometers or gyros, and is configured to disengage generation of electric power from the generative axle based on detection of ascending grade movement of the transport vehicle. The inertial sensor 524 identifies angular, centrifugal and inertial forces due to grade, turning, acceleration and other movements to identify when the transport vehicle is traveling up grade, coasting, braking or decelerating, cruising at equilibrium, or stationary. The momentum generation controller is further operable to disengage generation of electric power when acceleration or maintaining speed via cruising is identified. Acceleration and travel up a grade burdens the diesel tractor most significantly, and invocation of the generator at these times may have a detrimental effect. In contrast, engaging the generator 520 at constant speed cruising impacts efficiency negligibly. Braking, or coasting down grade when service brakes are likely to be applied anyway, effectively harvests the kinetic energy for electrical generation in lieu of being converted to heat by the brakes. Braking may also be detected from the brake lights on the trailer, affirmatively indicating brake application.

Another feature of the inertial sensor is identification of movement of the transport vehicle from a stopped position, such that the momentum generation controller is responsive to the inertial sensor to gradually increase electrical generation of electrical power for avoiding sudden inertial burden from overcoming a rotational resistance of the generator. When the generator is invoked to harvest (generate) electric power, a rotational resistance proportional to the generated current is produced. In other words, the momentum generation controller 522 is responsive to the controller 252 for indicating a kilowatt target to draw off the generator 520. If no generation is sought, the demand is nulled and the generator sees no electrical resistance to overcome. Otherwise, a start from a standing position would result in a noticeable "jerk" as the generator engages and imposes a kinetic load, stressing the trailer and possibly startling the tractor driver.

Figure 7:
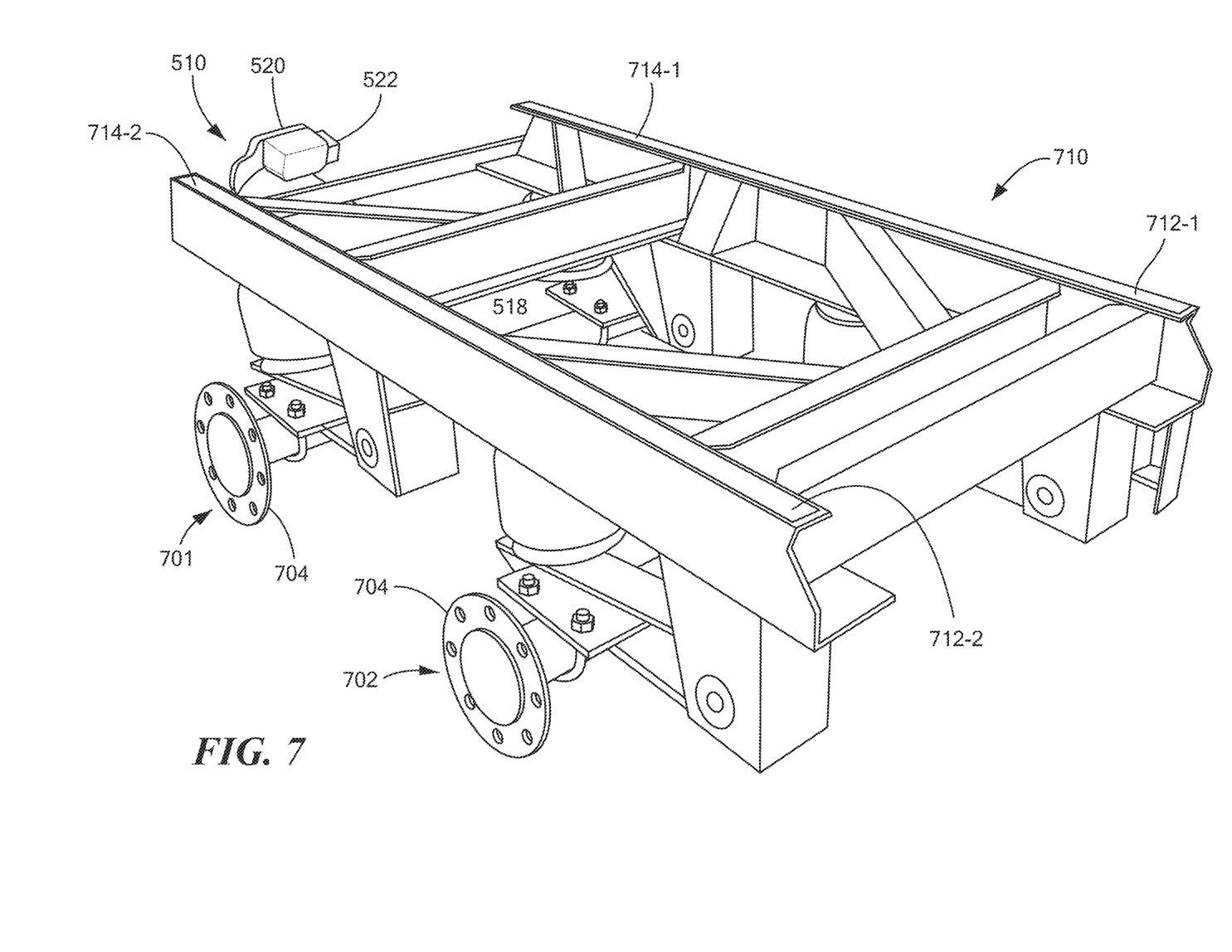
FIG. 7 is a perspective view of a split "slide box" suspension operable with the generative axle of FIG. 6.

FIG. 7 is a perspective view of a split "slide box" suspension operable with the generative axle of FIG. 6. Tractor trailer trucks may be equipped with a sliding axle suspension. This "slide box" suspension allows the trailer wheels to remain slightly offset from the tailgate, and more towards the center of the trailer, for optimal weight distribution during transport. Upon unloading, a sliding wheel suspension allows the wheels to slide toward the tailgate to a rearmost position, to enhance load bearing at the rear of the trailer in the event a forklift is driven into the cargo area 122 for unloading. Accordingly, the generative axle is coupled between one pair 701 of a plurality of pairs of opposed wheels 702 on the transport vehicle. A sliding suspension 710 is disposed between the regenerative axle 510 and the transport vehicle, such that the sliding suspension supports the wheels 704 in rotational communication with the sliding suspension during movement of the transport vehicle 120.

The sliding suspension 710 is configured for slidably disposing one pair of opposed wheels 702 rearward while maintaining the regenerative axle 510 in a fixed position relative to the transport vehicle and the coupled wheels 710. The regenerative axle needs to be supported in a fixed structural arrangement relative to the transport vehicle, and has electrical connections that may not be sufficiently flexible. Support rails 712-1 . . . 712-2 (712 generally) bear the trailer weight and may be split into segments at 714-1 . . . 714-2 (714 generally), or wheel pairs 702 may slide along the underside of the rails 712.

Figure 8A:
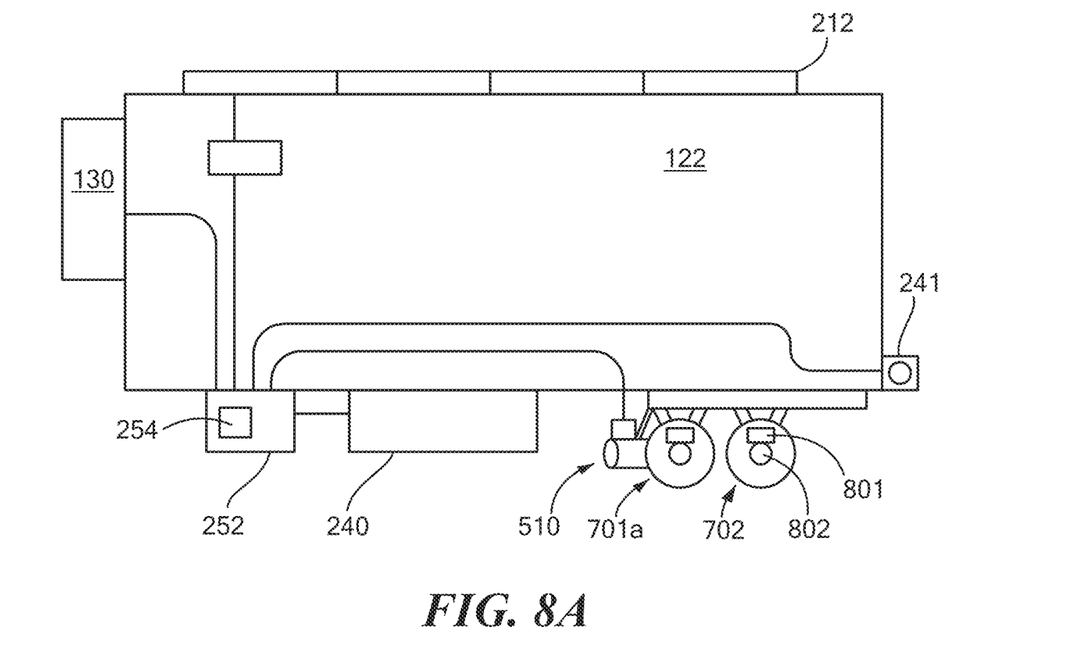
FIGS. 8A and 8B are a side view of the transport vehicle (trailer) of FIGS. 5-7 in use.
Figure 8B:
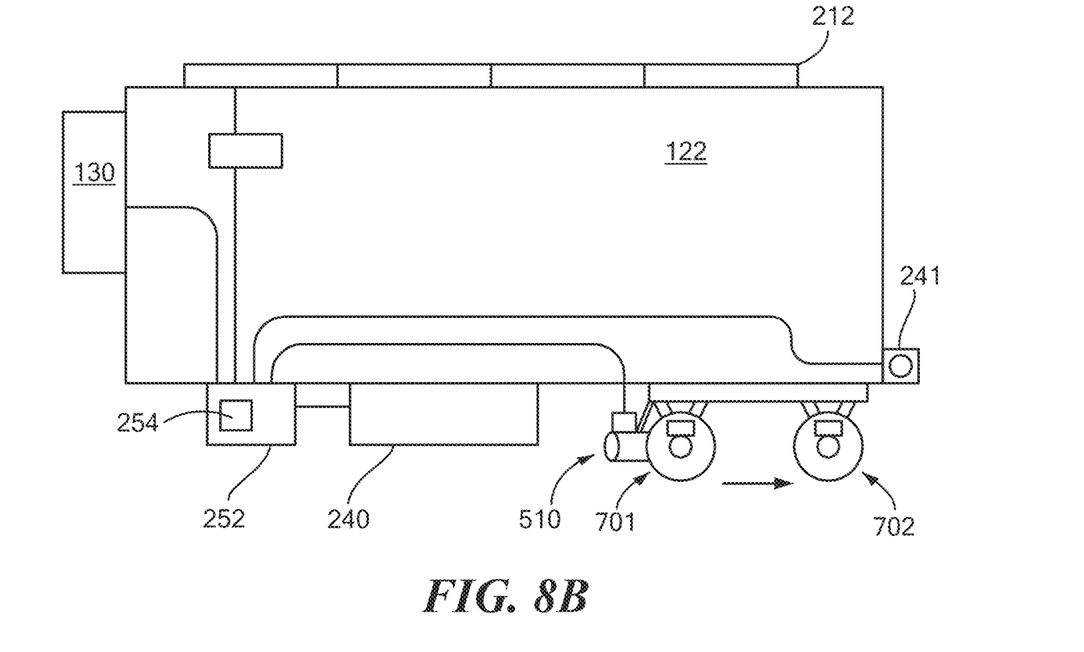

FIGS. 8A and 8B are a side view of the transport vehicle (trailer) of FIGS. 5-7 in use. Referring to FIGS. 1 and 5-8B, the movement of opposed wheels 702 are shown to 702' at the rearmost position of the trailer. A further enhancement is the operation of auto-inflate devices, which may be required in some regions. An auto-inflator 801 is disposed on the hub 802 of each wheel of the plurality of pairs of wheels on the transport vehicle. Since the live axle of the generative axle cannot employ a hollow void inside the axle for an air conduit, each auto-inflator is disposed on an outboard side of each wheel in a noninterfering position. The auto-inflator is in a non-interfering position both the slidable pair 702 of wheels and also in a noninterfering position with the pair of wheels 701 coupled to the generative axle. Although it is not strictly required for the slidable wheels to employ the outboard, noninterfering auto inflator, maintenance consistency suggests conformity.

Continuing to refer to FIGS. 1 and 5-8B, A system and method for powering an electric refrigeration unit 130 for a transport vehicle is shown, including receiving electric power from a storage element 240 and a passive vehicle source such as solar panels 212 or generative axle 510, such that each of the passive vehicle sources 210 produces electric power from sources incidental to transport of the refrigerated transport vehicle. Coasting, downhill rolling, and off-throttle positions are all passive harvesting scenarios where diesel consumption is not exacerbated. The controller 252 converts electrical characteristics of the electric power from the storage element 240 and the electrical characteristics of the electric power from the passive vehicle source 210 to correspond to electrical characteristics of the refrigeration unit 130. The refrigeration unit 130 typically expects a high voltage AC source, such as 208 or 460 V 3-phase, or 240/480 VAC, thus utilizing an inverter when sourced from the DC battery or solar panels. The generative axle 510 is configurable and is converted to 24 VDC (actually around 28 VDC for charging the battery), or to the AC of the refrigeration unit 130. The logic 254 then distributes the electric power from the passive vehicle source to the storage element and the refrigeration unit based on a cooling demand of the refrigeration unit.

A further source lies with shore power 241, allowing external connection to a grid AC source. The transport vehicle 120 therefore employs a shore power input 241, such that the shore power input is responsive to an external power source 242, typically 240 or 480 VAC at a bay configured for this specialty connection (warehouses, truck stops, etc.). As with the other passive sources and the battery, the controller 252 is configured for converting electric power from the external power source to correspond to the electrical characteristics of the storage element and the electrical characteristics of the refrigeration unit. It may also be directed in a prioritized manner to the refrigeration unit and the storage element directly, hence maintaining the refrigeration unit 130 while charging the battery with available excess. The shore power interface may also be responsive to a maximum power draw of the shore power input, and be further configured for limiting the total electrical power directed to the refrigeration unit and the storage element within the maximum power draw. Thus, the maximum draw when power is called for by both the battery and the refrigeration unit can be controlled so that available infrastructure is not overloaded.

While the system and methods defined herein have been particularly shown and described with references to embodiments thereof, it will be understood by those skilled in the art that various changes in form and details may be made therein without departing from the scope of the invention encompassed by the appended claims.

What is claimed is:
1. A transport vehicle, comprising:
  a plurality of passive vehicle sources configured to produce electric power from sources incidental to transport of the transport vehicle and provide the electric power to an electric load on the transport vehicle,
  wherein at least one of the plurality of passive vehicle sources is a generative axle assembly configured to passively generate the electric power from motive transport of the transport vehicle, the generative axle assembly comprising a generator centrally disposed between opposed wheels and substantially coplanar with a horizontal plane of a rotational axis of the opposed wheels;
  a storage element configured to store at least a portion of the electric power;
  a refrigeration unit powered by the electric power;
  a converter configured to transform electrical characteristics of the electric power to correspond to electrical characteristics of the refrigeration unit; and
  a controller configured to distribute the electric power from the plurality of passive vehicle sources to one of the storage element and the refrigeration unit, the controller configured to prioritize transmission of the electric power for supporting minimum requirements of the refrigeration unit and transmit an excess of the electric power to the storage element upon satisfaction of the minimum requirements of the refrigeration unit.

2. The transport vehicle of claim 1, wherein at least one of the plurality of passive vehicle sources comprises a solar panel array.

3. The transport vehicle of claim 1, wherein the generative axle assembly further comprises:
  a differential centrally disposed between the opposed wheels, the differential configured to couple the generator to a live axle extending along the rotational axis of the opposed wheels and transmit a rotational input of the live axle to the generator in the horizontal plane.

4. The transport vehicle of claim 1, wherein at least one of the plurality of passive vehicle sources comprises a shore power input, the shore power input responsive to an external power source.

5. The transport vehicle of claim 4, further comprising a shore power interface responsive to a maximum power draw of the shore power input, the shore power interface configured to limit a total electrical power directed to the refrigeration unit and the storage element within the maximum power draw.

6. The transport vehicle of claim 1, further comprising:
  a momentum generation controller disposed on the generative axle assembly, the momentum generation controller including an inertial sensor comprising one or more accelerometers and gyros configured to detect one or more of an angular, centrifugal and inertial force.

7. The transport vehicle of claim 6, wherein the momentum generation controller is configured to disengage the generation of the electric power by the generative axle assembly based on a detection of ascending grade movement of the transport vehicle by the inertial sensor.

8. The transport vehicle of claim 6, wherein the momentum generation controller is configured to disengage the generation of the electric power by the generative axle assembly when accelerating or maintaining speed via cruising is detected by the inertial sensor.

9. The transport vehicle of claim 6, wherein the momentum generation controller is configured to gradually increase the generation of the electrical power by the generative axle assembly when the inertial sensor detects a movement of the transport vehicle from a stopped position to avoid a sudden inertial burden from overcoming a rotational resistance of the generator.

10. The transport vehicle of claim 6, wherein the momentum generation controller is configured to engage the generation of the electric power by the generative axle assembly based a detection of off-throttle conditions of reduced diesel engine demand by the inertial sensor.

11. The transport vehicle of claim 6, wherein the momentum generation controller is configured to disengage the generation of the electric power by the generative axle assembly to reduce vehicle drag when the electric power is not called for.

12. The transport vehicle of claim 1, further comprising:
a sliding suspension disposed between the generative axle assembly and the transport vehicle,
the sliding suspension configured to allow at least one pair of additional opposed wheels to move relative to the generative axle assembly while the generative axle assembly remains in a fixed position relative to the transport vehicle and the at least one pair of additional opposed wheels.

13. The transport vehicle of claim 12, further comprising:
an auto-inflator disposed on an outboard side of the one or more of the opposed wheels and the additional opposed wheels, such that the auto-inflater is in a noninterfering position in relation to the sliding suspension.

14. The transport vehicle of claim 1, wherein the transport vehicle comprises a trailer.

15. A method for powering an electric refrigeration unit for a transport vehicle, comprising:
receiving electric power from a plurality of passive vehicle sources configured to produce the electric power from sources incidental to transport of the transport vehicle and provide the electric power to an electric load on the transport vehicle, wherein at least one of the plurality of passive vehicle sources comprises a generative axle assembly configured to passively generate the electric power from motive transport of the transport vehicle, the generative axle assembly comprising a generator centrally disposed between opposed wheels and substantially coplanar with a horizontal plane of a rotational axis of the opposed wheels;
storing at least a portion of the electrical power in a storage element;
converting electrical characteristics of the electric power to correspond to electrical characteristics of the refrigeration unit; and
distributing the electric power from the plurality of passive vehicle sources to one of the storage element and the refrigeration such that transmission of the electric power for supporting minimum requirements of the refrigeration unit is prioritized and an excess of the electric power is transmitted to the storage element upon satisfaction of the minimum requirements of the refrigeration unit.

16. The method of claim 15, wherein at least one of the plurality of passive vehicle sources comprises a solar panel array.

17. The method of claim 16, further comprising:
converting electrical characteristics of the electric power from the solar panel array to correspond to electrical characteristics of the storage element.

18. The method of claim 15, further comprising:
slidably separating at least one pair of additional opposed wheels in relation to the generative axle assembly based on an anticipated load point on the transport vehicle using a sliding suspension, the generative axle assembly remaining in a fixed position relative to the transport vehicle and the at least one pair of additional opposed wheels.

19. The method of claim 15, wherein the transport vehicle comprises a trailer.

20. The method of claim 15, further comprising:
selectively engaging and disengaging, by a momentum generation controller, the generative axle assembly based on a detection of one or more of angular, centrifugal, and inertial force by an inertial sensor comprising one or more accelerometers and gyros.

21. The method of claim 20, wherein the disengaging is based on a detection of ascending grade movement of the transport vehicle by the inertial sensor.

22. The method of claim 20, wherein the disengaging is based on a detection of acceleration or maintaining speed via cruising by the inertial sensor.

23. The method of claim 20, wherein the engaging is gradually increased based on a detection of movement of the transport vehicle from a stopped position by the inertial sensor to avoid a sudden inertial burden from overcoming a rotational resistance of the generator.

24. The method of claim 20, wherein the engaging is based on a detection of off-throttle conditions of reduced diesel engine demand by the inertial sensor.

25. The method of claim 15, further comprising:
disengaging the generative axle assembly to reduce vehicle drag when the electric power is not called for.

26. The method of claim 15, wherein the generative axle assembly further comprises:
a differential centrally disposed between the opposed wheels, the differential configured to couple the generator to a live axle extending along the rotational axis of the opposed wheels and transmit a rotational input of the live axle to the generator in the horizontal plane.

27. The method of claim 15, wherein at least one of the plurality of passive vehicle sources comprises a shore power input, the shore power input responsive to an external power source.

28. The method of claim 27, further comprising a shore power interface responsive to a maximum power draw of the shore power input, the shore power interface configured to limit a total electrical power directed to the refrigeration unit and the storage element within the maximum power draw.

* * * * *